(12) United States Patent
Anderson et al.

(10) Patent No.: US 6,520,234 B1
(45) Date of Patent: Feb. 18, 2003

(54) STEERED VACUUM-ASSISTED LAMINATING APPARATUS AND METHODS OF USE

(75) Inventors: Conrad V. Anderson, Minneapolis, MN (US); Brett A. Behnke, Welch, MN (US); John R. David, Stillwater, MN (US); Anne M. DePalma, Chisago City, MN (US); Ronald S. Steelman, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/576,624

(22) Filed: May 23, 2000

(51) Int. Cl.[7] ............................................. B32B 31/20
(52) U.S. Cl. ........................ 156/361; 156/381; 156/576; 156/574; 156/582
(58) Field of Search ................................. 156/574, 381, 156/382, 497, 285, 361, 582, 576, 71, 160, 163, 164, 324, 357, 358; 100/90

(56) References Cited

U.S. PATENT DOCUMENTS 3,900,362 A * 8/1975 Schaffer ...................... 156/60
4,867,816 A    9/1989 Suiter
4,944,514 A    7/1990 Suiter
5,106,439 A * 4/1992 Wellings et al. .............. 156/71
5,667,165 A * 9/1997 Gardner ..................... 242/588.2

FOREIGN PATENT DOCUMENTS

| DE | 197 33 935 A | 2/1999 | ........... B29C/63/02 |
| EP | 0 354 230 B | 2/1990 | |
| EP | 0 787 539 A | 8/1997 | ........... B08B/17/04 |
| FR | 2 300 249 A | 9/1976 | |
| WO | WO97/31077 | 8/1997 | |
| WO | WO00/43196 | 7/2000 | |

* cited by examiner

Primary Examiner—Richard Crispino
Assistant Examiner—George R. Koch, III
(74) Attorney, Agent, or Firm—James D. Christoff

(57) ABSTRACT

Steered vacuum-assisted laminating apparatus and methods of using the same are disclosed. The apparatus includes a vacuum-assisted laminator for applying large format films to substrates where lamination pressure is generated at least partially by a vacuum drawn in a vacuum cavity. The apparatus also includes a steering system to control the vertical position the laminator and a vehicle to move the laminator along the substrate in a desired direction.

16 Claims, 8 Drawing Sheets

STEERED VACUUM-ASSISTED LAMINATING APPARATUS AND METHODS OF USE

FIELD OF THE INVENTION

This invention concerns apparatus and methods for laminating films. More particularly, the present invention provides a steered vacuum-assisted laminating apparatus and methods of using the same.

BACKGROUND OF THE INVENTION

The lamination of films often requires that pressure be supplied to force the film against a substrate to which it is to be laminated. The substrate to which the film is to be laminated may be another film, a fabric, a structure (e.g., the side of vehicle, a wall, etc.) or any other object. The films are often coated with an adhesive to adhere the film to the substrate, but lamination of the adhesive-coated film under pressure often assists in providing a more secure bond between the film and the substrate. The use of pressure may also provide other advantages, e.g., reducing bubble formation, improving conformity, etc.

Although it is desirable to use pressure when laminating a film to a substrate, it can be difficult to provide enough pressure to effectively influence the lamination process. For example, when laminating two films to each other over, e.g. a roll structure, allowances must be made for deflection of the rolls because the lamination force can typically be applied only at the ends of the rolls. The result is that the size and weight of the rolls and supporting structure may be massive to compensate for roll deflection while generating sufficient and uniform pressure at the lamination point.

Another example can be found in the application of adhesive-coated plastic films, especially vinyl films, to a variety of surfaces for a variety of reasons such as advertisement, decoration, protection and the like. These surfaces can be very large in area, typically as much as 3 m×16 m. These films are adhered to very large horizontal or vertical surfaces such as walls, truck trailer sides, billboards, and the like. The films are seldom large enough to cover the entire surface with a single, integral film, so multiple films are typically used. In addition, attempts to make larger films result in films that are more difficult to handle and to register to other films. These surfaces have vast even and uneven portions, such as a truck trailer side that has flat surfaces interrupted by either corrugations or rivets, or both. These surfaces with some combination of flat portions, protrusions, and indentations require very skilled persons to adhere the film to the surfaces and then assure that such film adheres also to the protrusions or indentations, or both.

In the most common methods of applying these films, a small plastic squeegee approximately 10 cm long is typically used to manually force the film against the substrate. This is a very labor intensive process. Furthermore, this application requires skill and patience to get an application that is well adhered, free of wrinkles, and in which all films are in register.

Current techniques for treating rivets to minimize lifting involve (a) perforating the film around the rivet, (b) heating the film with a heat source, usually and hot air gun or a torch, and (c) burnishing down the film with a stiff brush, usually about 2.54 cm in diameter with 1.25 cm long bristles attached to a short wooden handle called a rivet brush. Often post-treatment with heat is used to increase bonding and further reduce stress in the film after it has been adhered to the irregular substrate. The film is typically heated while it is bridging the area around each type of surface irregularity, which can be summarized to be either a protrusion or an indentation. Because of the low mass of the film and the high temperature of the heat source, heating rates are several hundred degrees per second. Similar cooling rates are also occurring. If the film is too soft because of the heating when it is contacted with a circular motion using the rivet brush, the film is likely to be damaged. If the film is too cool, the stress is not eliminated adequately and lifting results eventually. It is therefore very difficult for one skilled in the art to assuredly adhere the adhesive-coated film to the irregular surface while the film is fully softened without damaging the film. If there is damage, the film is weakened at that location and diminishes the durability of the film. If there is an image graphic on that film, the image is marred at the damaged location. An aberration in an image, even if the image is as large as a mural on the side of truck trailer, is quite noticeable and unsatisfactory to the owner of the trailer, the marketer of a product shown in the mural on the trailer, and the graphic fabricator that has invested considerable labor and other effort to adhere the graphic film to the side of the trailer.

SUMMARY OF THE INVENTION

The present invention provides a steered vacuum-assisted laminating apparatus and methods of using the same. The apparatus includes a vacuum-assisted laminator for applying large format films to substrates where lamination pressure is generated at least partially by a vacuum drawn in a vacuum cavity. Advantages of the apparatus and methods include the ability to accurately apply films on a substrate using a vacuum-assisted laminator.

The apparatus and methods may be particularly useful to assist in the application of adhesive-coated plastic films, particularly vinyl films, to large area surfaces to provide improved appearance, durability, etc. Some of the most common surfaces include truck sides, walls, signs, portions of a building, vehicles, etc. These large surfaces require extensive time and labor for application of films. This often adds more cost to the project that does the film itself. Furthermore, many of these applications are on surfaces that contain compound-curved protrusions or indentations such as channels or rivets or other irregularities that increase application time and often produce wrinkles.

One problem in the art is that the application of films is being done using a small (approximately 10 cm) squeegee on very large graphics. With typical surfaces 3 meters high and 16 meters long in, e.g., truck applications and possibly much bigger for building graphics, application of the film can be very time consuming. The small rivets on the surface or series of indentations further complicate the application and are a source for wrinkles and similar defects.

The present invention solves the problem in the art by using a totally different technique, the force generated by a partial vacuum at the interface of application, to adhere adhesive-coated films to large area surfaces. The technique is also especially effective on smaller, irregular surfaces.

Even when applied with a vacuum-assisted laminator, accurate alignment of the laminator relative to the substrate to which a film is to be applied is important. The present invention provides steering systems that can be used to control the vertical position the laminator, distance between the laminator and the substrate, and can also move the laminator along the substrate in a desired direction.

In one aspect, the present invention provides a steered vacuum-assisted laminating apparatus for laminating a film to a substrate, the apparatus including a laminator having spaced-apart first and second laminating rolls mounted parallel to each other, a seal mechanism extending between the first and second rolls, wherein the seal mechanism roll forms a seal with each of the first and second rolls, a vacuum cavity formed between the seal mechanism and the first and second rolls, and a vacuum port in fluid communication with the vacuum cavity. The laminating apparatus further includes a steering system for guiding the laminator over the substrate, the steering system including a vertical control mechanism maintaining a selected vertical position of the laminator relative to a reference line, and a vehicle moving the laminator along the substrate in a travel direction.

In another aspect, the present invention provides method of laminating a film to a substrate by providing a steered vacuum-assisted laminating apparatus including a laminator and a steering system; locating a film between the substrate and at least one of the first and second rolls; drawing a vacuum in the vacuum cavity formed by the seal mechanism and the first and second laminating rolls, wherein the first and second laminating rolls are drawn against the substrate; and moving the laminator along the substrate in a travel direction while maintaining the laminator in a selected vertical position relative to a reference line, wherein the film is laminated to the substrate In another aspect, the present invention provides a steered vacuum-assisted laminating apparatus for laminating a film to a substrate, the apparatus including a laminator having spaced-apart first and second laminating rolls mounted parallel to each other, a seal mechanism extending between the first and second rolls, wherein the seal mechanism forms a seal with each of the first and second rolls, a vacuum cavity formed between the seal mechanism and the first and second rolls, and a vacuum port in fluid communication with the vacuum cavity. The laminating apparatus also includes means for guiding the laminator over the substrate, the means for guiding including means for maintaining a selected vertical position of the laminator relative to a reference line; and means for moving the laminator along the substrate in a travel direction.

A feature of the present invention is the laminator utilizes a partial vacuum, also known as negative pressure, in a vacuum cavity of the laminator to generate pressure on the laminator at the interface between the laminator and the substrate where a film is subsequently laminated. The resulting lamination pressure is essentially uniform across the lamination area because the negative pressures within the vacuum cavity are substantially equal.

When used to apply graphic images and other films to, e.g., trucks, other vehicles, sign surfaces, buildings, etc., one advantage of the present invention is labor savings of such significance that the overall total cost of an image graphic film applied to a large vertical or horizontal substrate, especially one having multiple compound or irregular surfaces can be substantially reduced. Furthermore, the quality of application is significantly improved, and often, lower adhesion adhesives can be used which reduce graphic removal time. Even with the cost of film remaining constant, the labor savings reduces the total cost of application of the film by as much as 80% and reduces the total cost of the applied film on a truck trailer by as much as 40%.

When, in conjunction with vacuum, heat is used in the lamination process, the conformability of the film around irregular or compound-curved surfaces is improved such that less aggressive adhesives can be used. These adhesives, often called removable or changeable adhesives, can save 80% of the time normally associated with removal of the graphic films. This can further cut the total cost of installed and removed applied films by as much as 60%.

With these substantial labor savings using the article and method of the present invention, one company can provide an entire product of both film goods and installation/removal services at a price considerable less than currently offered where the producer of the film goods and the installer of the film goods are unrelated companies.

Another advantage of the invention is that large sheets of film can be laminated to surfaces at high productivity of speed and assured lamination.

Another advantage of the invention is that the apparatus and methods are effective on both fabric-sided trucks and metallic-sided trucks, making one technique versatile for a graphics film installer. The fabric and the metal can both flex under the partial vacuum applied by the laminator of the present invention, improving the uniformity of the lamination pressure.

Another advantage of the invention is that the laminator can provide nearly 100% wetting area of the adhesive against the surface of the substrate whereas conventional squeegee usage can only achieve about 80% wetting. The use of a partial vacuum uses the power of a fluid to apply equal pressure at every point of contact of the film to the surface, something that is extremely difficult, if not impossible, to achieve when applying pressure with a device such as a squeegee. That advantage is even more apparent with surfaces that are filled with irregularities or compound curves or both.

As used in connection with the present invention, the term "vacuum" is used to describe negative pressure as compared to ambient pressure. The term does not require that an absolute or extremely negative pressure vacuum be drawn or maintained, although in some instances it may be possible and/or desirable to achieve large negative pressures in connection with the present invention.

Other features and advantages will be described below using the following drawings.

ILLUSTRATIVE EMBODIMENTS OF THE INVENTION

Figure 1:
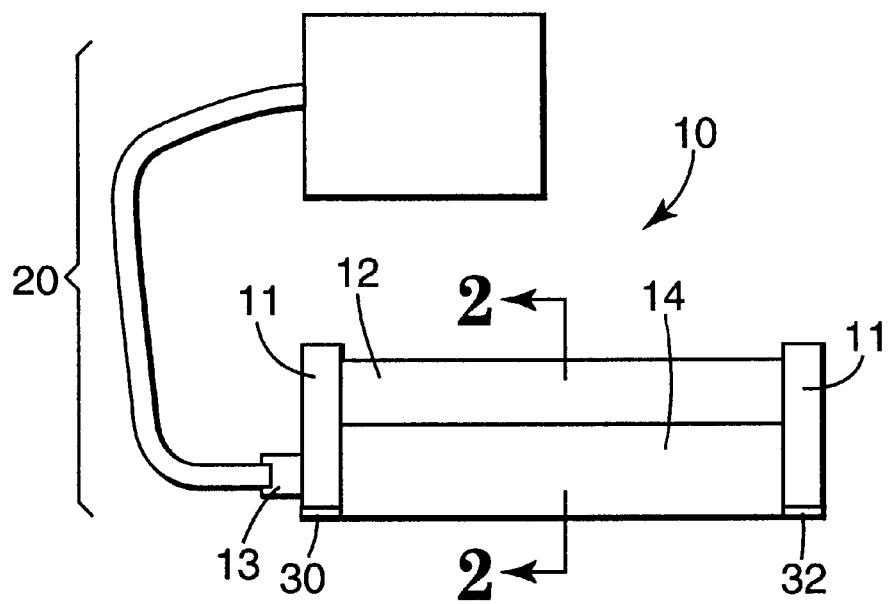
FIG. 1 is a diagrammatic front view of one lamination apparatus of the present invention.
Figure 2:
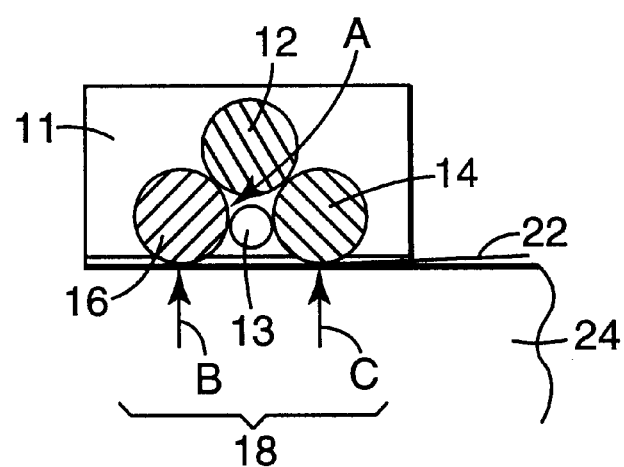
FIG. 2 is a diagrammatic cross-sectional view of the apparatus of FIG. 1 along lines 2—2 in FIG. 1.

FIGS. 1 and 2 show one lamination apparatus 10 having a frame 11. At least one end of the frame 11 includes a vacuum port 13 in fluid communication with a vacuum cavity A formed in between the rolls 12, 14, and 16. The rolls 12, 14, and 16 combine to defined the vacuum cavity A and to provide lamination pressure on a film. The rolls 12, 14 and 16 are preferably circular and rotate about longitudinal axes extending through their centers. The longitudinal axes of the rolls are generally parallel to each other.

The lamination apparatus 10 may also include a vacuum or negative pressure source 20 that generates a partial vacuum (negative pressure) within the vacuum cavity A. That vacuum draws the outer rolls 14 and 16 against film 22 and the substrate 24 to provide the desired lamination pressure.

The substrate 24 on which the outer rolls 14 and 16 are mounted may be flat, or it may be curved such as, e.g., a roll. Furthermore, substrate 24 may be another film located on a flat or curved surface and to which the film 22 is to be laminated. In other applications, the substrate may be flexible, but under tension such as, e.g., a fabric surface used on a truck trailer.

Although the illustrative embodiments depicted herein rely on sealing rolls, the seal mechanisms used in the laminating apparatus of the present invention could alternatively be replaced with multiple rolls or a hard shell with vacuum seals against the outer rolls 14 and 16.

Figure 3:
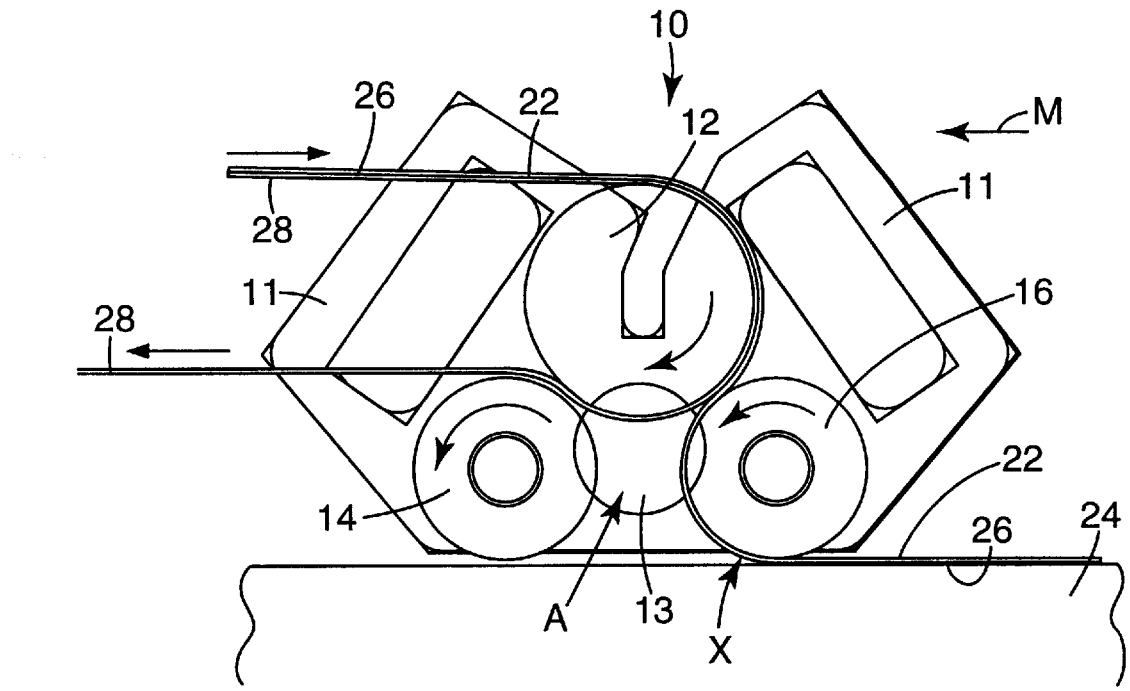
FIG. 3 is a diagrammatic side view of one use of a lamination apparatus of the present invention.

As seen in FIG. 3, the film 22 may include, e.g., a coating of a pressure sensitive or pressure activated adhesive 26 protected by a liner 28. The lamination apparatus 10 greatly aids in the lamination of, e.g., pressure sensitive adhesive coated films to surfaces such as truck sides, signs, etc. As discussed below, the present invention also provides vacuum-assisted lamination apparatus and methods that can be used to laminate two sheets or films together in continuous web processes.

The outer rolls 14 and 16 of the laminator 10 are provided to seal against a substrate surface 24 as well as to provide the desired lamination pressure along those nip points. One of the outer rolls 14 and 16 maybe harder or less conformable that the other to improve lamination. One or both of the nips formed between the outer rolls 14 and 16 may also include a film 22 being laminated to the substrate surface 24. The sealing roll 12 is provided to define and seal the vacuum cavity A between the outer rolls 14 and 16. The sealing roll 12 forms a rolling seal with each of the outer rolls 14 and 16. The sealing roll 12 may also provide a nip point at which a liner or other layer can be stripped from a film before it is laminated to the substrate surface 24.

It may be desirable that at least a portion of the sealing roll 12 be transparent, such that the vacuum cavity A can be visually monitored during lamination. In some instances, the transparent portion may extend over the length of the roll 12, and in other instances, only a portion of the length may be transparent.

Referring to FIG. 2, the force of negative pressure from source 20 (see FIG. 1) generates a partial vacuum within vacuum cavity A between the rolls 12, 14, and 16 and the substrate 24. Subatmospheric pressure within the vacuum cavity A, compared with ambient pressure outside of vacuum cavity A then draws the rolls 12, 14, and 16 and the surface 24 together, thus creating pressure on the surface of rolls 14 and 16 in contact with the substrate surface at contact interfaces B and C.

The pressure distributed over the length of the rolls is at least partially dependent on (1) the distance between interfaces B and C times the length of laminator 18, (2) the negative pressures that can be obtained in the vacuum cavity A. For example, the lamination pressure at interfaces B and C may be about 175 Newtons/m (1 lbs./in) or more, more preferably about 250 Newtons/m or more. In some instances, it may be desirable to achieve pressures of about 1000 Newtons/m or more, even more desirably, about 2000 Newtons/m or more, and still more desirably about 3000 Newtons/m or more.

The upper pressure limit will depend on a variety of factors such as the strength of the components used in the lamination apparatus 10, the capabilities of the vacuum source, the strength of the surface 24 to which films are being laminated, etc. In some instances it may be desirable to provide a pressure relief device or devices to relieve excessive pressures before the lamination force becomes too great. Pressures in excess of 4500 Newtons/m are possible with 30 cm roll spacing and only 30% air evacuation in the vacuum cavity.

A set of rolls 12, 14, and 16 that are each 137 cm (about 54 inches) long with a distance of 20.3 cm (8 inches) between interfaces B and C and a standard shop vacuum as source 20 that generates 27.4 kPa could apply 3818 Newtons per roll or 2,783 Newtons/m (858 lbs./roll or 15.89 lbs/lineal in./roll) of force to each of the two rolls 14 and 16 at each of interfaces B and C. Using conventional frames and mounting systems, it would be very difficult to apply that much pressure to the rolls without either deflecting the rolls or the substrate surface. Such a frame would also be massive, very heavy, and very difficult to handle by persons skilled in the art, especially against a vertical surface.

Optionally but preferably, FIG. 1 shows conformable seals 30 and 32 on frame 11 to assist in the formation of negative pressure within the vacuum cavity A in the two directions orthogonal to interfaces B and C.

Because vacuum is used to supply the lamination forces and the negative pressure is distributed substantially equally over the surfaces of the rolls 12, 14, and 16, relatively insubstantial roll structures are required for rolls 12, 14, and 16. In many instances, the roll structures may include hollow cores. Those lightweight structures can be contrasted with the massive metal rolls that would otherwise be required for positive pressure lamination using rolls to limit undesirable roll deflection near the middle of the rolls. The rolls used in the lamination apparatus of the present invention may, in some instances, weigh less than one-tenth of the conventional metallic rolls needed to apply over 3800 Newtons of force with a similar length device.

The rolls used in the apparatus and methods of the present invention may preferably include outer surfaces that are soft enough to conform to the substrate surface. The use of conformable rolls may improve sealing at the nip points between the rolls, which can assist in the generation and maintenance of desirable negative pressure levels in the vacuum cavity. The conformability may also be useful to improve contact between the rolls and films being laminated when confronting irregularities or compound curves on the surface. Thus, if the substrate surface contains raised or lower areas, such as rivets or dents, soft rolls are desired to insure complete compliance of the film with the substrate surface. A soft rubber roll with a high coefficient of friction to the pressure sensitive film works very well on riveted surfaces. Another possible roll composition is foam rubber. Furthermore, it has been found that an intimate contact of the film to the roll at the interface of application to the substrate helps prevent wrinkling from occurring when applied over rivets and on irregular surfaces. A high degree of wrap also aids in supporting the film.

Presently preferred for surfaces containing irregularities is a soft rubber roll having a Shore Scale hardness of from about Shore 00 10 to about Shore A 60, more preferably from about Shore 00 30 to about Shore A 30. If the substrate does not contain irregularities, harder roll surfaces (e.g., metallic surfaces) may be used and can potentially develop higher pressures as compared to softer rolls.

The diameters of the rolls 12, 14, and 16 can vary depending on a number of factors such as the lamination pressures desired, the length of the rolls, etc. It may be desirable th at the relative diameters of the rolls possess certain relationships. For example, it may be desirable that the outer rolls 14 and 16 have substantially equal diameters. It may also be preferred that the sealing roll 12 located between both outer rolls 14 and 16 have a larger diameter than the outer rolls 14 and 16 to increase the spacing between the outer rolls 14 and 16 without making all of the rolls larger. In some instances, the distance (D) between the centers of the outer rolls 14 and 16 may be determined by the following equation:

$$D=\sqrt{(2AB+A^2)}$$

where A is the diameter of each of the outer rolls 14 and 16 (which are the same) and B is the diameter of the sealing roll 12 to reduce or prevent the rolls from bending when a vacuum is drawn in the vacuum cavity A.

In some instances, such as the application of polymeric films carrying graphic images to, e.g., truck trailers, the rolls 14 and 16 may have diameters ranging from about 4 cm to about 23 cm, preferably from about 5 cm to about 13 cm.

It may be desirable that the size and construction of the rolls 12, 14, and 16 be such that, during lamination, the outer rolls 14 and 16 deflect or bow inwardly towards each other. Alternatively, it may be desirable if only the outer roll or rolls around which a film is wrapped deflect or bow inwardly. Such deflection may assist in reducing wrinkles in the lamination process by, in effect, spreading the film outwardly from the center of the deflected rolls. The deflection may be controlled by varying the tension on the film or films wrapped around the deflected roll or rolls. The deflection may also be controlled by varying the negative pressure in the vacuum cavity A, varying roll size, or varying spacing between outer rolls 14 and 16. In some instances, it may be desirable to use flexible rolls for laminating films on curved surfaces. applicator 10 can be mounted on horizontal or vertical rails or any other suitable structure for wide webs (greater than about 60 cm) or can be hand held or mounted on a hand held pole for narrow webs (less than about 30 cm). Therefore, the width of the applicator 10 can be varied according to the needs of those skilled in the art and can be used to adhere films ranging from wallpaper to graphic marking film marketed by Minnesota Mining and Manufacturing Company (3M) of St. Paul, Minn., USA under the brands of Controltac™ and Scotchcal™ films.

FIG. 3 shows one use of the laminator 10 of the present invention. A laminate of film 22, adhesive 26, and liner 28 (protecting adhesive 26) are threaded between sealing roll 12 and roll 16 and separate between roll 12 and roll 16, with liner 28 following the circumference of roll 12 to roll 14 and the adhesive-coated film 22 following the circumference of roll 16 to a point of contact with substrate 24, indicated as interface X within vacuum cavity A. Within vacuum cavity A, the outer roll 16 forces the adhesive 26 on film 22 against substrate 24 at interface X as rolls 14 and 16 rotate counterclockwise and sealing roll 12 rotates clockwise (as shown with appropriate arrows) and interface X advances in the direction of motion M.

Figure 4:
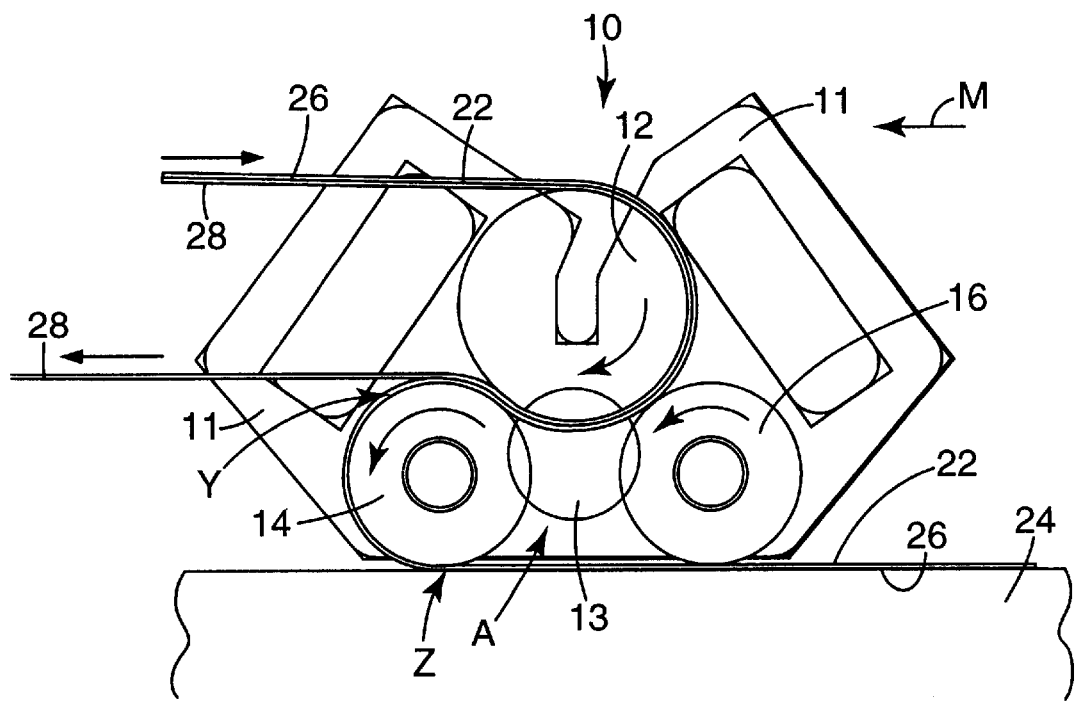
FIG. 4 is a diagrammatic side view of another use of a lamination apparatus of the present invention.

FIG. 4 shows another threading of film/liner laminate, where film 22, adhesive 26, and liner 28 enter the laminator 10 between roll 12 and roll 16 from the direction toward which applicator 10 moves (motion M). Thus the laminate of film 22 and liner 28 contacts the circumference of sealing roll 12, but the point of delamination occurs at point Y between roll 12 and roll 14 with liner 28 returning the same direction as motion M. In this embodiment, the film 22 first contacts substrate 24 outside of vacuum cavity A but is forced against the substrate 24 by outer roll 14 at interface Z once motion M causes film 22 to enter vacuum cavity A. Outer roll 16 also provides a laminating force against the film 22 and substrate 24.

Figure 5:
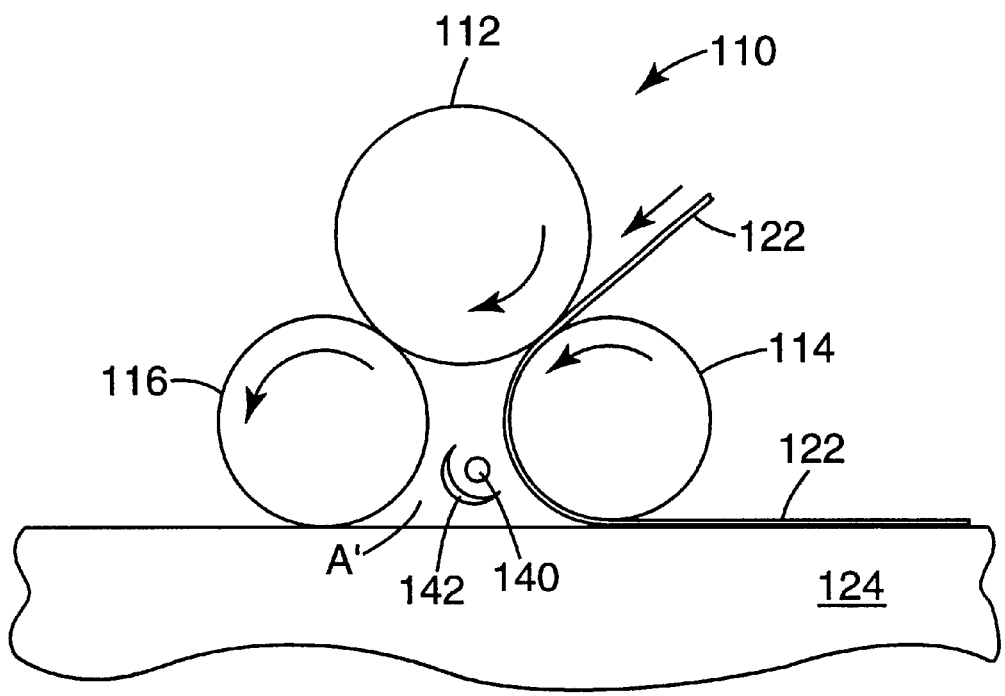
FIG. 5 is a diagrammatic side view of another lamination apparatus according to the present invention.

To improve lamination, one or both of the outer rolls 14 and 16 could also be heated. Referring to FIG. 5, in another alternative, a heating device may be positioned either outside of the laminator 110 to heat a film before it enters the vacuum cavity A' or, as illustrated in FIG. 5, a heating device 140 may be located within vacuum cavity A' to heat the film 122. The heating device 140 may include a heat shield to at least partially control the direction in which thermal energy travels. Examples of suitable heating devices include, but are not limited to: infrared heaters, resistance heaters, carbon filaments, quartz irradiators, etc. If the heat is applied while the film is outside the vacuum cavity, e.g., before entering or after exiting the vacuum chamber, hot air may be used.

The use of heat in connection with laminating films is disclosed in copending, commonly-assigned, U.S. patent application Ser. No. 09/236,806, filed on Jan. 25, 1999 and its continuation-in-part patent application, U.S. patent application Ser. No. 09/479,648 filed on Jan. 7, 2000

The laminators of the present invention could ride on a mounting frame or otherwise conveyed across the surface of the substrate. Furthermore, the substrate surface is drawn toward the rolls so any uneven or flexible film is easier to use with the applicator of the present invention than with a pressure system.

Usefulness of the Invention

Laminators manufactured according to the present invention permit one skilled in the art to apply film 22 in subatmospheric pressure (FIG. 3) or atmospheric pressure (FIG. 4) using vacuum-assisted lamination pressures to quickly and assuredly adhere the film 22 against the substrate 24 even if such substrate 24 has surface aberrations, compound curves, or irregularities compared with a flat surface. The substrate can be aligned vertically or horizontally. The apparatus can traverse in any desired direction, e.g., horizontally, vertically, etc. Alternatively, the apparatus may remain stationary while the substrate moves.

Furthermore, the lamination pressures that can be achieved are not reliant on the forces used to move the laminator into position against a surface. For example, the lamination apparatus may be held on an extend pole above the head of, e.g., an operator. After a vacuum is drawn in the vacuum cavity, the laminator can supply the desired lamination forces independent of the forces provided by the operator on, e.g., the outer frame of the device. In another example, the lamination apparatus may be suspended on ropes, cables, or other structures that move it into position over a substrate. Activation of the vacuum source can then draw the laminator against the substrate to provide the desired lamination pressures.

Any adhesive-coated film can benefit from the applicator of the present invention, e.g., heat activated adhesives can be used in conjunction with heat. Nonlimiting examples of such films include any film presently sold by Minnesota Mining and Manufacturing Company (3M) of St. Paul, Minn., USA under the brands of Scotchcal™; Controltac™ and the like.

It has been found that an adhesive-coated film, namely: Controltac™ 180 film can be successfully adhered using the applicator of the present invention. It has also been found that as much as 80% of the time normally required for adhering a typical graphic marking film can be saved, reducing the total cost of adhering such film by as much as 40%.

An entirely new business method can be created using the applicator and methods of the present invention. The business method may include contracting with an owner of an image to make that image on a graphic marking film, wherein the maker of the graphic marking film prints the image and assembles the image graphic film onto a substrate using the applicator and method of the present invention. Alternatively, the film maker can subcontract the use of the applicator and method to permit remote subcontractor(s) to assemble the graphic film(s) on the substrate(s) for further distribution or usage. Preferably, the image is distributed to multiple remote locations and printed and assembled using the same techniques at all locations, all benefiting from the labor savings afforded by the applicators and methods of the present invention.

The vacuum assist applicator of the present invention can also be used to "finish" a pressure sensitive film that is lightly adhered to a surface, in which case it would not pass between the rolls, but the rolls would only apply high pressure.

Figure 6:
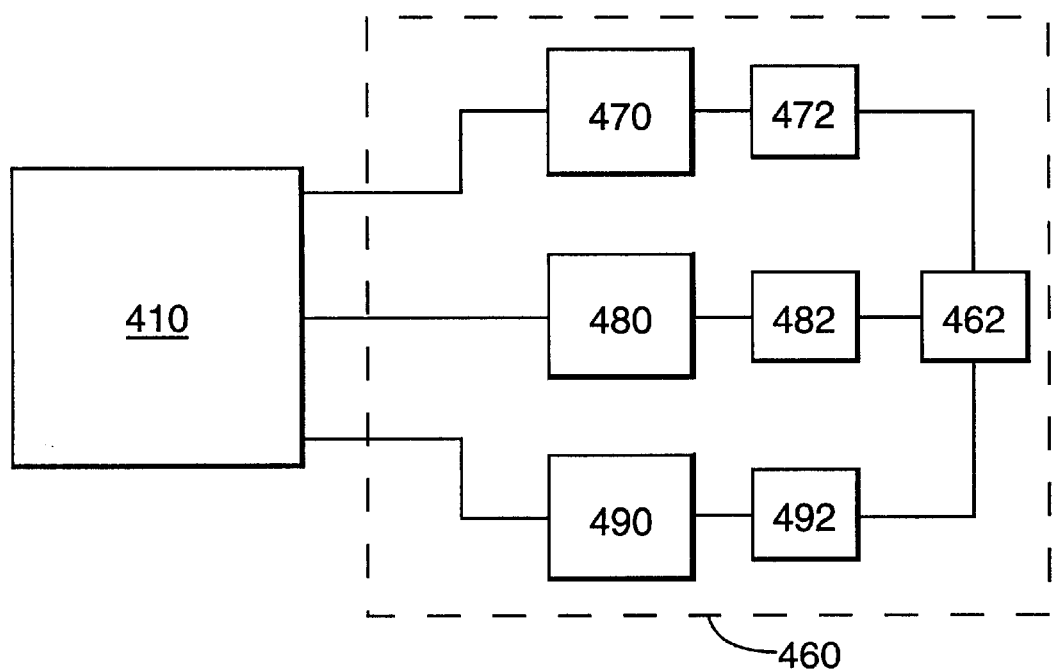
FIG. 6 is a schematic block diagram of one steered laminating apparatus according to the present invention.

FIG. 6 is a schematic block diagram of one embodiment of a steered vacuum-assisted laminating apparatus according to the present invention. The apparatus includes a laminator 410 that may be constructed similar to the laminating devices described above in connection with, e.g., FIGS. 1 & 2. Briefly, however, the laminator 410 preferably includes spaced-apart laminating rolls and a seal mechanism forming a vacuum cavity as described in more detail above.

The laminator 410 is steered along a substrate during lamination of a film using a steering system 460. The illustrated steering system 460 may include a variety of components including, e.g., a vertical control mechanism 470 that can maintain the laminator 410 in a selected vertical position relative to a reference line 462. The steering system 460 may also optionally include a depth control mechanism 480 that can maintain the laminator 410 a selected depth from the substrate. The steering system 460 may also include a vehicle 490 that can move the laminator 410 along the substrate in a travel direction.

The reference line 462 may take a variety of forms but is preferably fixed or stationary relative to the substrate on which the film is to be applied. Typically, the reference line 462 will be straight and may take a variety of forms. Examples of some suitable reference lines 462 may include, but are not limited to, laser beams, features on the substrate (e.g., the edge of trailer wall), guide wires (buried or otherwise), mechanical guides (e.g., wires, bars, etc.) fixed relative to the substrate, etc. The use of a laser beam as a reference line 462 may include the use of a rotating laser beam that defines a reference plane as is well known in, e.g., the construction industry. Alternatively, a laser beam may be aligned parallel to the substrate, thereby defining a straight line relative to the substrate. Depending on its form, the reference line 462 may be detected mechanically (e.g., using limit switches), electrically (e.g., Hall effect sensors, RF sensors, etc.), optically (e.g., using photocells), or by any other suitable technique.

Referring again to FIG. 6, the vertical control mechanism 470 may detect the reference line 462 using a sensor 472 that is selected based on the form of the reference line 462. Similarly, the depth control mechanism 480 may include a sensor 482 that can detect the reference line 462. This embodiment of a depth control mechanism 480 generally requires a reference line 462 that is located a fixed distance from the substrate. The vehicle 490 may also include a sensor 492 for detecting the reference line 462 to assist in moving the laminator 410 in the travel direction. In such an arrangement, it may be preferable that the reference line 462 be parallel to the travel direction. In some instances, at least a portion of the function of the depth control mechanism 480 can be provided by the vehicle 490 when the vehicle 490 is guided along the substrate at a fixed distance from the substrate. For example, the vehicle 490 can provide gross control over the depth between the laminator 410 and substrate, while the depth control mechanism provides fine control over the depth between the laminator 410 and substrate that complements the control provided by the vehicle 490.

Figure 7:
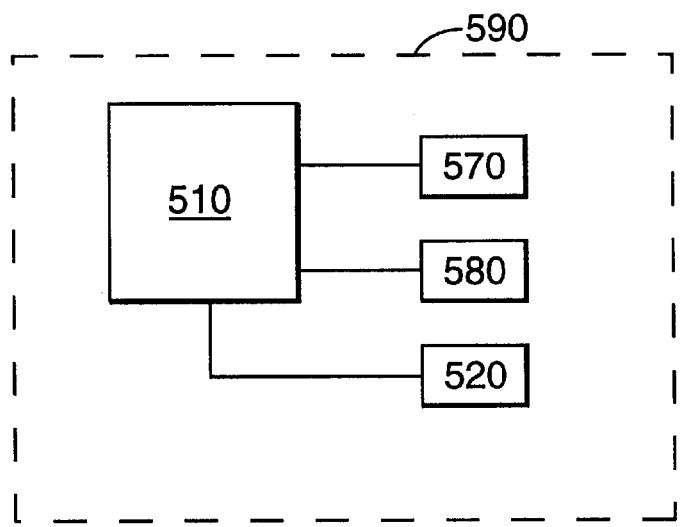
FIG. 7 is a schematic block diagram of another steered laminating apparatus according to the present invention.

FIG. 7 illustrates another illustrative embodiment of a steered vacuum-assisted laminating apparatus according to the present invention. The apparatus includes a laminator 510, vertical control mechanism 570, and optional depth control mechanism 580 all mounted on vehicle 590. Also optionally included in the apparatus is a vacuum source 520 in fluid communication with the laminator 510 to provide the desired vacuum used during laminating.

The travel control mechanism 590 may preferably be a self-contained vehicle, i.e., a vehicle that includes a motor and wheels, tracks, etc. that allow the vehicle 590 to move under its own power. It may be further preferred that the vehicle 590 be a guided vehicle that detects and moves along the substrate at a fixed distance therefrom. The guiding may rely on the reference line used by the vertical control mechanism 570 or it may rely on other reference systems. For example, a vertical reference line may be provided and detected by the vertical control mechanism to control the vertical position of the laminator 510 while a separate vehicle reference line may be provided and detected by the vehicle 590 to guide the vehicle 590 along the substrate.

Figure 8:
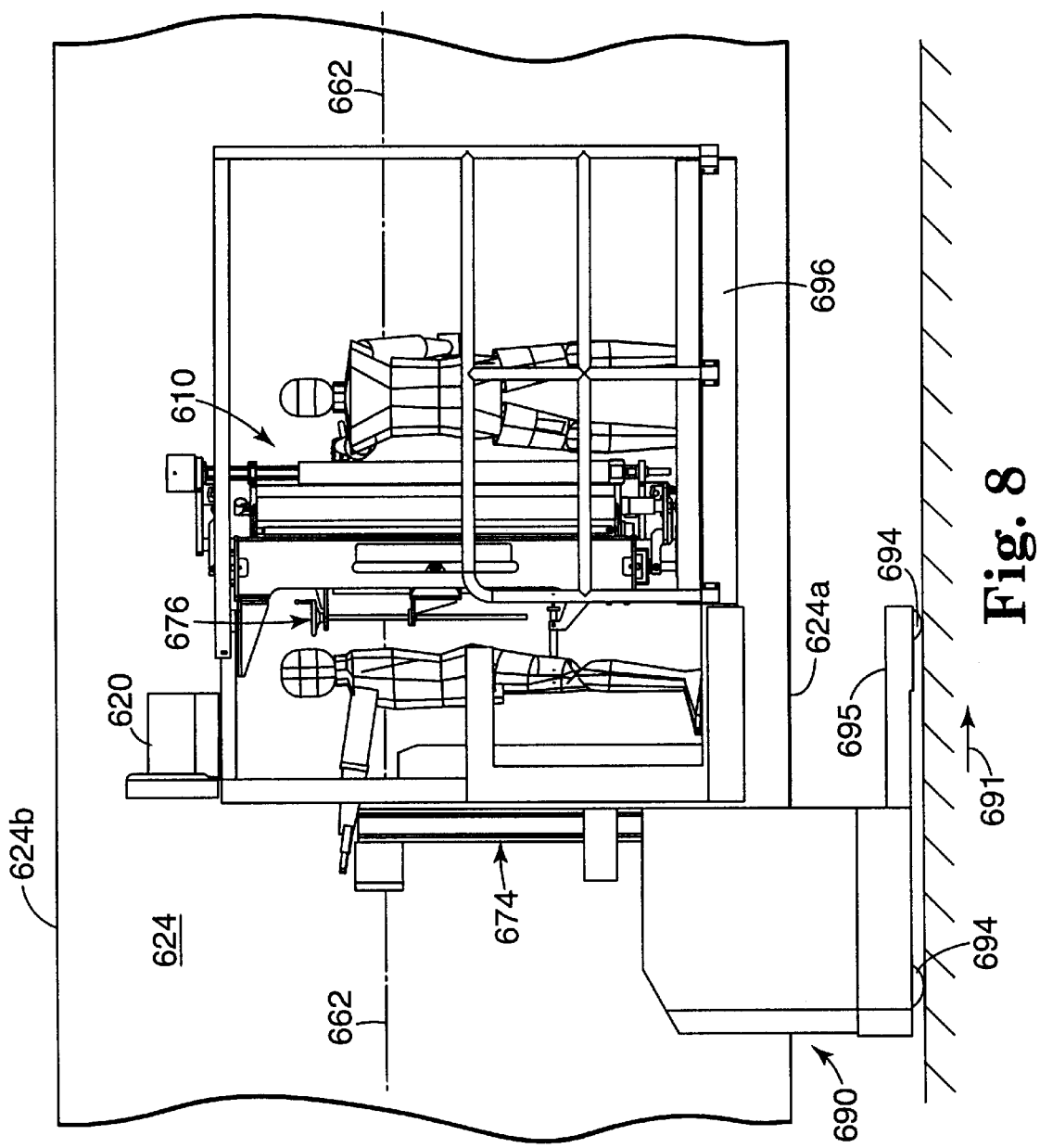
FIG. 8 is a view of a steered laminating apparatus according to the present invention.
Figure 9:
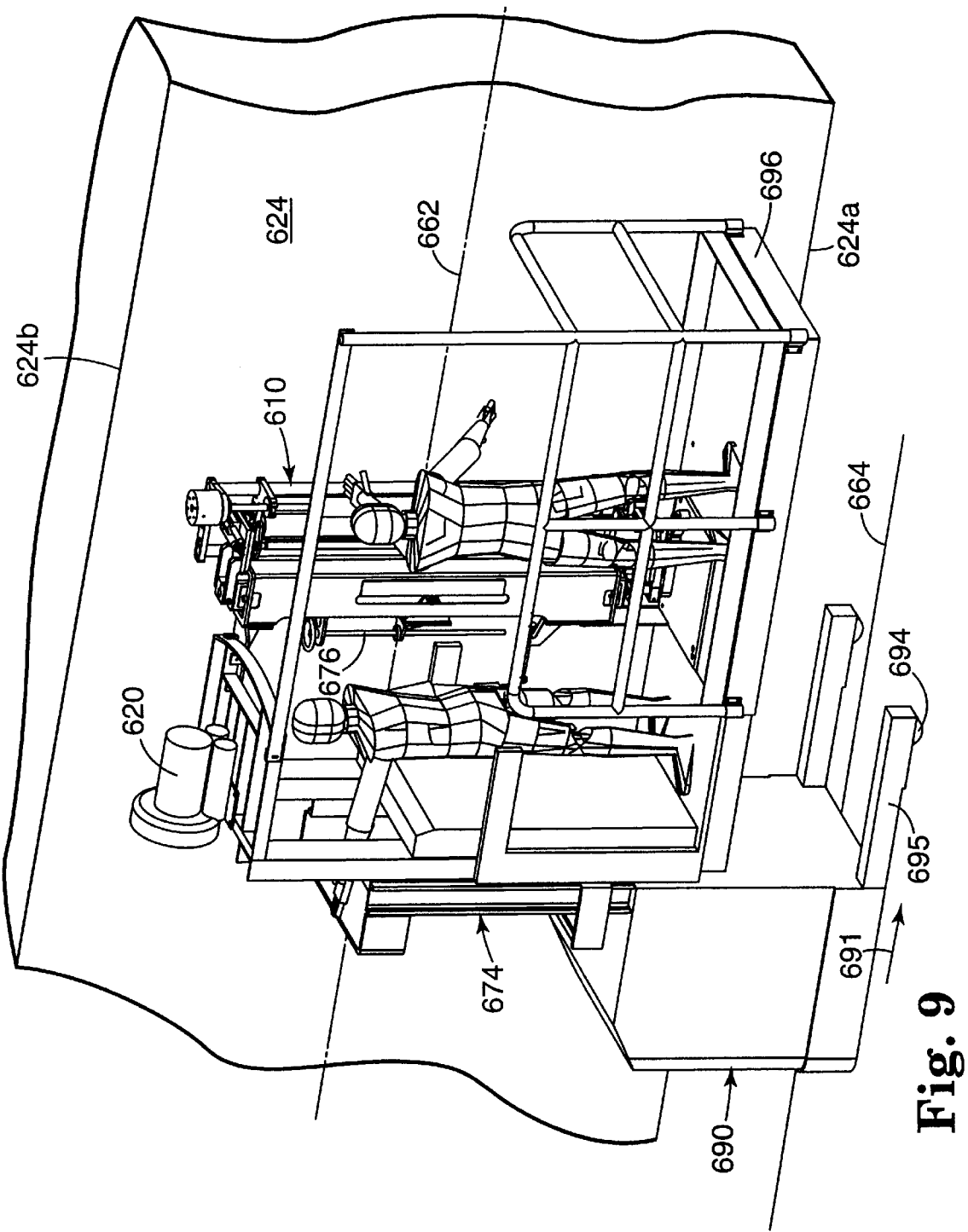
FIG. 9 is a perspective view of the steered laminating apparatus of FIG. 8.

FIGS. 8 and 9 illustrate one embodiment of a steered laminating apparatus that includes a self-contained, guided vehicle 690. The vehicle 690 may, for example, be adapted from a commercially available vehicle. The depicted vehicle includes wheels 694 to move the vehicle 690 in the travel direction as indicated by arrow 691. By "self-contained" as used to describe the vehicle 690, it is meant that the vehicle 690 includes an on-board power source capable of providing power to the various systems mounted on the vehicle 690. For example, the vehicle 690 may include batteries, an internal combustion engine or engines, etc.

A laminator 610 is mounted on the vehicle 690 and is used to apply a film to substrate 624 using vacuum as described above. A reference line 662 is provided to assist with vertical positioning of the laminator 610 (and, ultimately, the film).

The apparatus of FIGS. 8 & 9 also includes a vertical control mechanism provided in two different components. A gross vertical adjustment mechanism 674 is provided to raise the upper deck 696 of vehicle 690 above the base 695 (which is, itself, supported by wheels 694). The gross vertical adjustment mechanism 674 may be provide in any suitable manner, e.g., hydraulic cylinders, scissors-lift, jack screws, etc. Regardless of the exact form, it is desired that the gross vertical adjustment 674 provide rough positioning of the laminator 610 relative to the reference line 662.

Once that rough positioning is accomplished, a fine vertical adjustment mechanism 676 may be provided to more precisely position the laminator 610 relative to the reference line 662. The fine vertical adjustment mechanism 676 may take a variety of forms, e.g., a screw, hydraulic cylinders, etc.

Also seen in FIG. 8 is a vacuum source 620 mounted on the vehicle 690 for supplying vacuum to the laminator 610 during operation. The vacuum source 620 is preferably powered by the same energy source used to move the vehicle 690 in the travel direction 691.

Although the apparatus of FIGS. 8 & 9 is illustrated as relying on reference line 662 for vertical positioning, features such as the lower edge 624a or upper edge 624b of the substrate 624 could also be used for vertical positioning of the laminator 610 (assuming that such features can be correlated with the desired position of the film). In other alternatives, the floor, rails, or other structures supporting the vehicle 690 may be used for vertical positioning if they are suitably straight and/or level relative to the desired position of the laminator 610. Such features or structures may provide alternative forms of mechanical guides as used in connection with the present invention.

FIG. 9 also depicts a separate vehicle reference line 664 along which the vehicle 690 is guided. The vehicle reference line 664 may be provided in the form of a guide wire as is commonly used in connection with guided vehicle systems (which can be detected by a sensor located on the vehicle 690). Alternatively, the vehicle reference line may be provided in the form of a mechanical guide, e.g., a rail or other physical structure along which the vehicle 690 travels. Where the vehicle reference line 664 is located a fixed distance from the substrate 624, it can be used to control the distance between the laminator 610 and the substrate 624.

Figure 10:
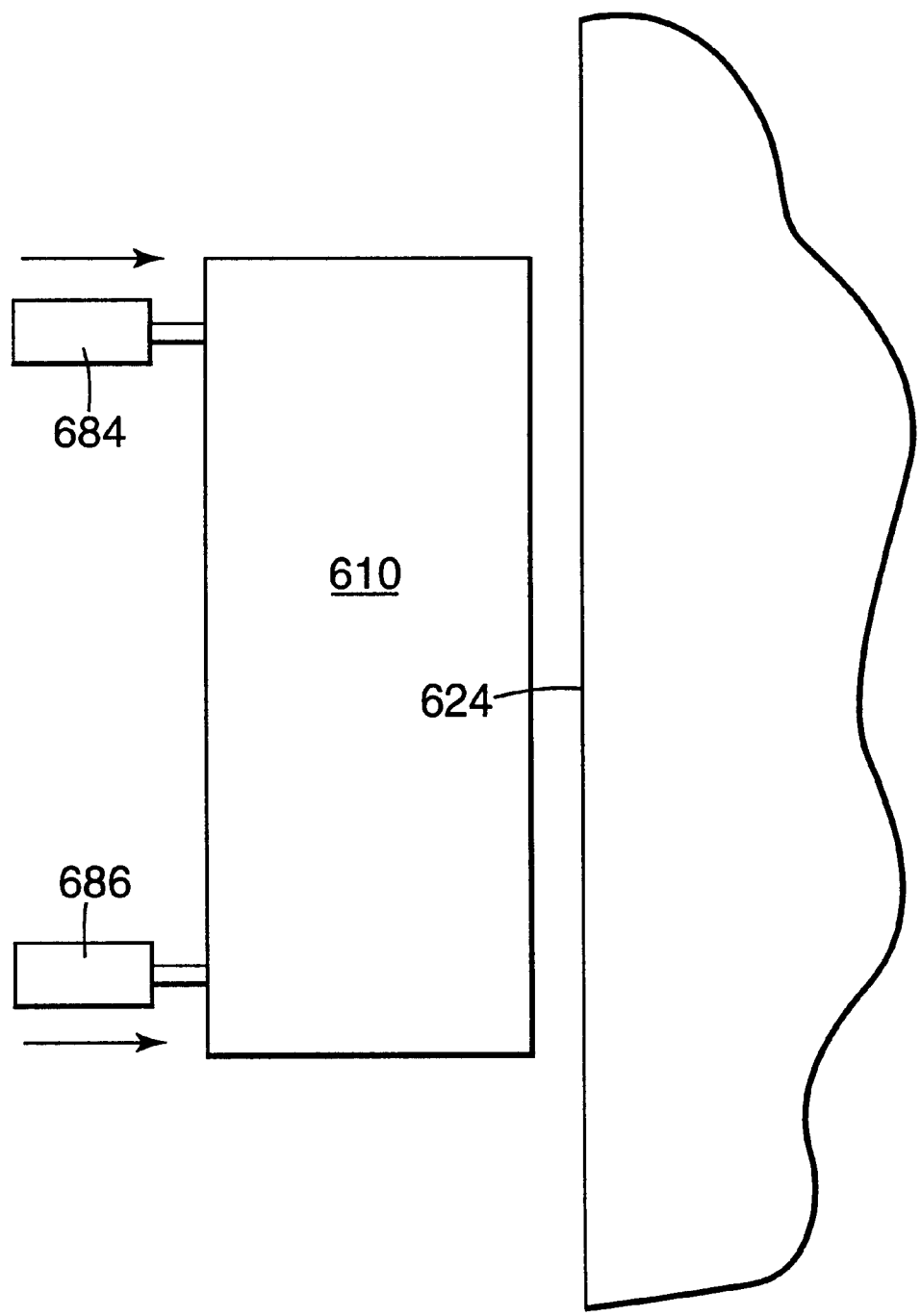
FIG. 10 is a schematic diagram illustrating biasing of a laminator towards a substrate.

As seen in FIG. 9, the reference line 662 may preferably extend along the substrate 624 at a fixed distance therefrom (where the reference line appears as a point in FIG. 10 which is taken parallel to the planar substrate 624). As a result, reference line 662 may also be used to control the distance between the laminator 610 and the substrate 624. The reference line 662 could also be used to guide the vehicle 690 along the substrate 624.

In addition to guiding the vehicle 690 to control the depth between the laminator 610 and the substrate 624, it may also be desirable to include one or more biasing mechanisms to force the laminator 610 towards the substrate 624. Biasing the laminator 610 towards the substrate 624 may provide an advantage in that, if the vacuum is lost, some pressure is maintained on the film being laminated to the substrate 624 until vacuum can be restored or the application process can be stopped.

It may further be preferred to independently bias the upper and lower ends of the laminator 610 towards the substrate 624. By "independently," it is meant that the ends of the laminator 610 are free to move (within limits) without regard to the position of the opposing end of the laminator 610. As a result, the laminator 610 may be better able to maintain contact with a substrate 624 that may not be perfectly vertically aligned with, e.g., the vehicle 690. Referred to FIG. 10, a schematic diagram of laminator 610 is depicted including an upper biasing mechanism 684 and a lower biasing mechanism 686. Each biasing mechanism acts to force the laminator 610 towards the substrate 624. The biasing mechanisms may be provided in any suitable form, e.g., hydraulic cylinders, spring mechanisms, inflatable bladders, solenoids, etc.

Figure 11:
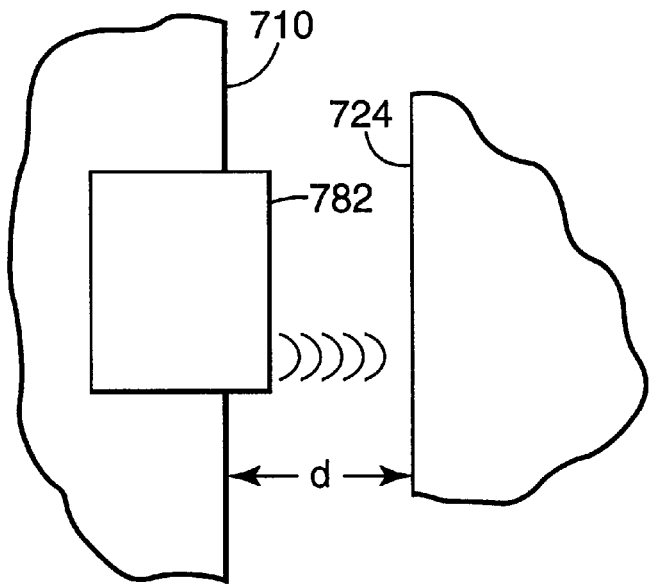
FIGS. 11 & 12 depict alternative mechanisms for guiding a vehicle along the substrate and/or maintaining the selected distance d between the laminator and the substrate.
Figure 12:
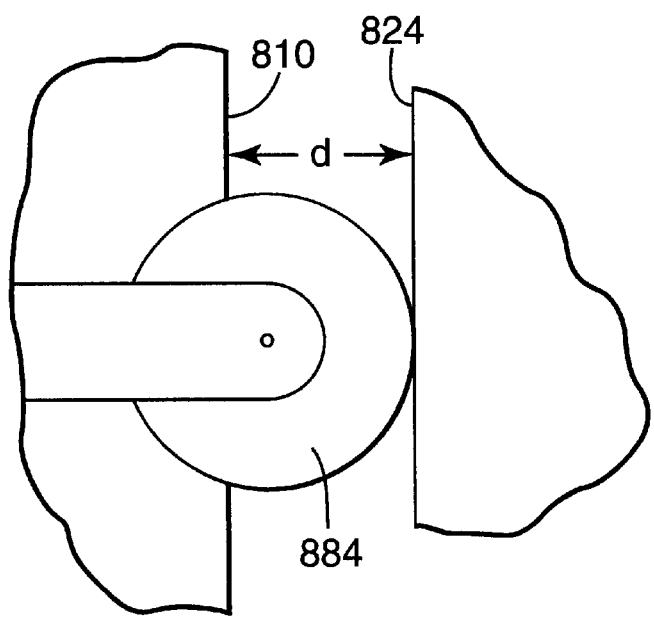

FIGS. 11 and 12 illustrate some alternative techniques and mechanisms for guiding a vehicle along the substrate and/or maintaining the selected distance d between the laminator and the substrate. In FIG. 11, the laminator 710 includes, e.g., an ultrasonic, infrared, or other non-contact sensor 782 that detects the substrate 724. Alternatively, a contact sensor, e.g., mechanical limit switch, may be used to position the laminator 710 relative to the substrate 724. Actual positioning of the laminator 710 may be accomplished, e.g., by steering a vehicle on which the laminator 710 is mounted. Alternatively, the laminator 710 may be mounted on, e.g., slides, and moved towards or away from the substrate 724 by hydraulic cylinders, a jack screw, or any other suitable mechanism.

FIG. 12 depicts a laminator 810 that includes a mechanical spacer to maintain a selected distance between the laminator 810 and substrate 824. The illustrated mechanical spacer is provided in the form of a wheel 784 that preferably rolls on the substrate 824, thereby establishing the selected distance d between the laminator 810 and substrate 824. Many different mechanical spacers will be known to those skilled in the art, e.g., slides, etc.

The preceding specific embodiments are illustrative of the practice of the invention. This invention may be suitably practiced in the absence of any element or item not specifically described in this document. The complete disclosures of all patents, patent applications, and publications are incorporated into this document by reference as if individually incorporated in total.

Various modifications and alterations of this invention will become apparent to those skilled in the art without departing from the scope of this invention, and it should be understood that this invention is not to be unduly limited to illustrative embodiments set forth herein, but is to be controlled by the limitations set forth in the claims and any equivalents to those limitations.

What is claimed is:

1. A steered vacuum-assisted laminating apparatus for laminating a film to a substrate, the apparatus comprising:
 a laminator comprising spaced-apart first and second laminating rolls mounted parallel to each other, a seal mechanism extending between the first and second rolls, wherein the seal mechanism roll forms a seal with each of the first and second rolls, a vacuum cavity formed between the seal mechanism and the first and second rolls, and a vacuum port in fluid communication with the vacuum cavity; and
 a steering system for guiding the laminator over the substrate, the steering system comprising:
  a vertical control mechanism maintaining a selected vertical position of the laminator relative to a reference line; and
  a vehicle moving the laminator along the substrate in a travel direction.

2. The apparatus of claim 1, wherein the reference line comprises a laser beam and the vertical control mechanism comprises a sensor detecting the laser beam.

3. The apparatus of claim 1, wherein the reference line comprises a mechanical guide and the vertical control mechanism comprises a sensor detecting the mechanical guide.

4. The apparatus of claim 1, wherein the reference line comprises a guide wire and the vertical control mechanism comprises a sensor detecting the guide wire.

5. The apparatus of claim 1, wherein the vertical control mechanism comprises a gross vertical adjustment mechanism and a fine vertical adjustment mechanism.

6. The apparatus of claim 1, further comprising a depth control mechanism maintaining a selected depth between the laminator and the substrate.

7. The apparatus of claim 6, wherein the vehicle comprises a guided vehicle moving along the reference line, and further wherein the depth control mechanism comprises the guided vehicle.

8. The apparatus of claim 6, wherein the depth control mechanism comprises upper and lower biasing mechanisms proximate upper and lower ends of the laminator, the biasing mechanisms forcing the laminator towards the substrate.

9. The apparatus of claim 8, wherein the upper and lower biasing mechanism operate independently of each other.

10. The apparatus of claim 6, wherein the depth control mechanism comprises a mechanical spacer attached to the laminator.

11. The apparatus of claim 6, wherein the depth control mechanism comprises a sensor detecting the substrate.

12. The apparatus of claim 1, wherein the vehicle comprises a self-contained vehicle.

13. The apparatus of claim 12, wherein the vertical control mechanism is mounted on the vehicle.

14. The apparatus of claim 12, wherein the vehicle comprises a vacuum source in fluid communication with the vacuum port of the laminator.

15. The apparatus of claim 12, wherein the vertical control mechanism is mounted on the vehicle, and further wherein a vacuum source in fluid communication with the vacuum port of the laminator is mounted on the vehicle.

16. A steered vacuum-assisted laminating apparatus for laminating a film to a substrate, the apparatus comprising:

a laminator comprising spaced-apart first and second laminating rolls mounted parallel to each other, a seal mechanism extending between the first and second rolls, wherein the seal mechanism forms a seal with each of the first and second rolls, a vacuum cavity formed between the seal mechanism and the first and second rolls, and a vacuum port in fluid communication with the vacuum cavity; and means for guiding the laminator over the substrate comprising:

means for maintaining a selected vertical position of the laminator relative to a reference line; and means for moving the laminator along the substrate in a travel direction.

* * * * *

UNITED STATES PATENT AND TRADEMARK OFFICE
CERTIFICATE OF CORRECTION

PATENT NO. : 6,520,234 B1
DATED : February 18, 2003
INVENTOR(S) : Anderson, Conrad V.

It is certified that error appears in the above-identified patent and that said Letters Patent is hereby corrected as shown below:

<u>Title page,</u>
Item [57], ABSTRACT,
Line 7, insert -- of -- preceding "the".

<u>Column 1,</u>
Line 14, insert -- be -- following "to".
Line 14, insert -- a -- following "of".
Line 62, "usually and" should read -- using a --.

<u>Column 2,</u>
Line 18, insert -- a -- following "of".
Line 41, replace "that" with -- than --.
Line 63, insert -- of -- preceding "the".

<u>Column 3,</u>
Line 14, insert -- a -- following "provides".
Line 25, insert -- . -- following "substrate".

<u>Column 4,</u>
Line 7, "considerable" should read -- considerably --.

<u>Column 5,</u>
Line 7, "defined" should read -- define --.
Line 43, "maybe" should read -- may be --.
Line 44, "that" should read -- than --.

<u>Column 6,</u>
Line 6, "lbs." should read -- lb. --.

<u>Column 7,</u>
Line 15, "th at" should read -- that --.
Line 50, insert -- The -- preceding "applicator" and start a new paragraph.

<u>Column 8,</u>
Line 35, insert -- . -- following "2000".
Line 58, "extend" should be -- extended --.

UNITED STATES PATENT AND TRADEMARK OFFICE
CERTIFICATE OF CORRECTION

PATENT NO. : 6,520,234 B1
DATED : February 18, 2003
INVENTOR(S) : Anderson, Conrad V.

It is certified that error appears in the above-identified patent and that said Letters Patent is hereby corrected as shown below:

<u>Column 11,</u>
Line 1, "provide" should read -- provided --.

Signed and Sealed this

Twenty-second Day of July, 2003

JAMES E. ROGAN
*Director of the United States Patent and Trademark Office*